United States Patent  (10) Patent No.: US 8,943,516 B2
Mamidala et al.  (45) Date of Patent: Jan. 27, 2015

(54) MECHANISM FOR OPTIMIZED INTRA-DIE INTER-NODELET MESSAGING COMMUNICATION

(75) Inventors: Amith R. Mamidala, Yorktown Heights, NY (US); Valentina Salapura, Chappaqua, NY (US); Robert W. Wisniewski, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 13/485,074

(22) Filed: May 31, 2012

(65) Prior Publication Data

US 2013/0326180 A1 Dec. 5, 2013

(51) Int. Cl.
G06F 3/00 (2006.01)
G06F 9/44 (2006.01)
G06F 9/46 (2006.01)
G06F 13/00 (2006.01)

(52) U.S. Cl.
USPC .......................................................... 719/313

(58) Field of Classification Search
None
See application file for complete search history.

(56) References Cited

U.S. PATENT DOCUMENTS

| | | | |
|---|---|---|---|
| 6,859,862 B1 * | 2/2005 | Liao et al. ...................... | 711/129 |
| 6,976,131 B2 * | 12/2005 | Pentkovski et al. ........... | 711/146 |
| 7,640,549 B2 * | 12/2009 | Shen et al. ..................... | 719/313 |
| 8,196,147 B1 * | 6/2012 | Srinivasan et al. ............. | 719/310 |
| 8,347,038 B2 * | 1/2013 | Sapronov et al. .............. | 711/130 |
| 2009/0083493 A1 * | 3/2009 | Kinter ............................ | 711/141 |
| 2012/0069029 A1 * | 3/2012 | Bourd et al. ................... | 345/502 |
| 2012/0266183 A1 * | 10/2012 | Sandstrom ..................... | 719/312 |

OTHER PUBLICATIONS

Aggarwal et al., On communication latency in PRAM computation, Proceedings of the ACM Symposium on Parallel Algorithms and Architectures, pp. 11-21, Jun. 1989.
Alexanddrov, Incorporating long messages into the LogP model for parallel computation, Journal of Parallel and Distributed Computing, 44(1):71-79, 1997.
Culler, Towards a realistic model parallel computation, Proceedings of the ACM SIGPLAN Symposium on Principles and Practices of Parallel Programming, May 1993.
Frank, Modeling contention in parallel algorithms, Proceedings of the ACM SIGPLAN Symposium on Principles and Practices of Parallel Programming, pp. 276-287, Jun. 1997.

* cited by examiner

*Primary Examiner* — H S Sough
*Assistant Examiner* — William C Wood
(74) *Attorney, Agent, or Firm* — Scully, Scott, Murphy & Presser, P.C.; Daniel P. Morris, Esq.

(57) ABSTRACT

Point-to-point intra-nodelet messaging support for nodelets on a single chip that obey MPI semantics may be provided. In one aspect, a local buffering mechanism is employed that obeys standard communication protocols for the network communications between the nodelets integrated in a single chip. Sending messages from one nodelet to another nodelet on the same chip may be performed not via the network, but by exchanging messages in the point-to-point messaging buckets between the nodelets. The messaging buckets need not be part of the memory system of the nodelets. Specialized hardware controllers may be used for moving data between the nodelets and each messaging bucket, and ensuring correct operation of the network protocol.

20 Claims, 9 Drawing Sheets

MECHANISM FOR OPTIMIZED INTRA-DIE INTER-NODELET MESSAGING COMMUNICATION

FIELD

The present application relates generally to computers, and computer applications, and more particularly to computer architecture and more particularly to messaging in a semiconductor chip or die.

BACKGROUND

Electronic circuit chips (or integrated semiconductor circuit) are being built with increasing numbers components integrated on the chips. A single chip is fabricated to hold an integration of multiple nodelets. Even still, each nodelet on a single chip can have a number of processors. Processors in a nodelet can be homogeneous (i.e., of the same type) or heterogeneous (i.e., of different types). Each nodelet has its memory system, however, memory between nodelets are not shared. That is, each nodelet has a separate memory coherence domain.

In a multi-node system, nodes communicate between each other by using one or more network protocols. For many applications, the amount of communication between neighboring nodes is higher than between remote nodes. Similarly, communications between neighboring nodes is more frequent than between the more remote nodes. Mapping logically "close" nodes to physically neighboring nodes reduces latency and power consumption. By mapping logically close nodes to nodes on the same chip, significant part of the communication stays on the chip. Nodelets participate in a larger multi-node system by network connections using a network protocol, typically using Message Passing Interface (MPI) protocol.

Network communication, however, still involves overhead such as the work that needs to be implemented for network protocol tasks, transmitting packets, and receiving packets.

Message Passing Interface (MPI) is a programming paradigm used for high performance computing (HPC). The model has become popular mainly due to its portability and support across HPC platforms. Because MPI programs are written in a portable manner, programmers optimize application-related aspects, such as computation and communication, but typically do not optimize for the execution environment. In particular, MPI tasks are often mapped to the processors in a linear order.

Determining the communication patterns of applications have been studied by A. Aggarwal, A. K. Chandra, and M. Snir. On communication latency in PRAM computation. In Proceedings of the ACM Symposium on Parallel Algorithms and Architectures, pages 11-21, June 1989, and by A. Alexandrov, M. F. Ionescu, K. E. Schauser, and C. Scheiman. Log GP: *Incorporating long messages into the Log P model for parallel computation*. Journal of Parallel and Distributed Computing, 44(1):71-79, 1997.

Independently of such communication pattern studies, another category of existing technology provides a model to guide the MPI programmer. However, early models explicitly ignored hardware characteristics to simplify the model. More recent models (see, D. Culler, R. Karp, D. Patterson, A. Sahay, K. E. Schauser, E. Santos, R. Subramonian, and T. von Eicken. *Log P: Towards a realistic model parallel computation*. In Proceedings of the ACM SIGPLAN Symposium on Principles and Practices of Parallel Programming, May 1993; and M. I. Frank, A. Agarwal, and M. K. Vernon. *LoPC:* *Modeling contention in parallel algorithms*. In Proceedings of the ACM SIGPLAN Symposium on Principles and Practices of Parallel Programming, pages 276-287, June 1997) attempt to develop a theoretical model for generic networks. However, such modeling has not employed empirical data to improve the model accuracy. With the existing techniques, it is difficult to obtain performance benefits.

BRIEF SUMMARY

A method and system for intra-die inter-nodelet messaging communication may be provided. The method, in one aspect, may include allocating a bucket comprising a memory array and hardware control logic that supports message passing interface semantics, for communicating data between a first process on a first memory domain and a second process on a second memory domain, wherein the first memory domain and the second memory domain are not shared, and wherein the bucket is not part of the first memory domain or the second memory domain. The method may also include mapping the bucket to the first process. The method may further include writing, by the first process, message data to the bucket and invoking a send message passing interface function that raises a hardware signal to the second process. The method may yet further include mapping the buffer to the second process in response to the second process invoking a receive message passing interface function, wherein the second process is enabled to read the data in the mapped bucket.

A system for intra-die inter-nodelet messaging communication, in one aspect, may include a plurality of nodelets on a single chip, each of the nodelets having its own memory coherence domain that is not shared with the rest of the nodelets on the single chip, each nodelet comprising one or more process cores, wherein the plurality of nodelets comprise at least a first nodelet having a first process core and a first memory coherence domain, and a second nodelet having a second process core and a second memory coherence domain. The system may also include a bucket comprising a memory array and hardware control logic that supports message passing interface semantics, for communicating data across the plurality of nodelets, wherein the bucket is not part of the memory coherence domains of the nodelets. The first process core is enabled to map the bucket to the first process core, write message data to the bucket and invoke a send message passing interface function that raises a hardware signal to the second process core. In response to the second process core invoking a receive message passing interface function, the buffer is mapped to the second process core for enabling the second process core to read the data.

A method for intra-die inter-nodelet messaging communication, in another aspect, may include reserving a bucket comprising a memory array and hardware control logic that supports message passing interface semantics, for communicating data between a first process on a first memory domain and a second process on a second memory domain, wherein the first memory domain and the second memory domain are not shared, and wherein the bucket is not part of the first memory domain or the second memory domain. The method may also include setting a plurality of control bits to indicate exclusive read and write access for the first process only. The method may further include receiving a send call invoked by the first process. The method may yet further include setting the control bits to indicate shared read and write access for the first process and raising a hardware signal for the second process. The method may still yet include receiving a receive call invoked by the second process. The method may further include setting the control bits to indicate shared read and write access for the second process. The method may also include, in response to receiving an un-map call from the first process, setting the control bits to indicate exclusive read and write access for the second process. The method may also include, in response to receiving an un-map call from the second process, setting the control bits to indicate exclusive read and write access for the first process.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The most network traffic when running scientific and high performance applications within a complex multi-node system is between relatively local nodes, with only smaller part going to relatively remote nodes in a system. Thus, it would be beneficial to have fast and efficient way of communicating between the local nodes.

The present disclosure describes communication mechanisms across different memory domains. In one aspect, low-overhead, low-latency point-to-point intra-nodelet messaging support for nodelets on a single chip that obey MPI semantics is provided. In one aspect, a local buffering mechanism is employed that obeys standard communication protocols for the network communications between the nodelets integrated in a single chip. Sending messages from one nodelet to another nodelet on the same chip is performed not via the network, but by exchanging messages in the point-to-point messaging buckets between the nodelets in one embodiment of the methodology of the present disclosure. The messaging buckets are not part of the memory system of the nodelets. Specialized hardware controllers are used for moving data between the nodelets and each messaging bucket.

Figure 1:
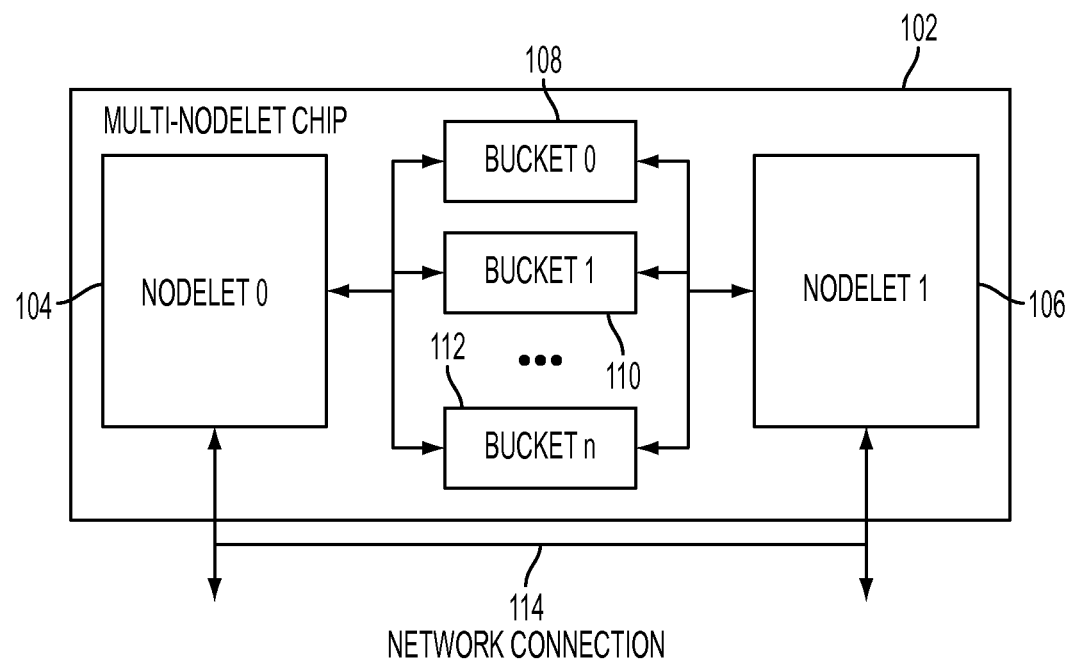
FIG. 1 illustrates components of a multi-nodelet chip in one embodiment of the present disclosure.

FIG. 1 illustrates components of a multi-nodelet chip in one embodiment of the present disclosure. Multiple nodelets (e.g., 104, 106) may be integrated in a chip 102. Each nodelet (e.g., 104, 106) may have one or more homogeneous or heterogeneous processor cores. Each nodelet (e.g., 104, 106) also has its separate memory system. Memory between nodelets (e.g., 104, 106) is not shared. Nodelets (e.g., 104, 106) participate in a larger multi-node system using network connections 114 and the MPI protocol. Messages from a process within a nodelet to other processes located on different chips are sent vie network interface and network. Messages from a process within a nodelet to another process in a different nodelet on the same chip is not preformed via the network but by exchanging messages in the point-to-point messaging buckets (e.g., 108, 110, 112) between the nodelets. In one embodiment, point-to-point messaging buckets (e.g., 108, 110, 112) are used for transferring MPI data between the nodelets (e.g., 104, 106) on the same chip 102. A bucket (e.g., 108, 110, 112) comprises memory space and hardware control logic that obeys messaging protocol such as MPI, and can be used by all nodelets on the chip to transfer messages from one nodelet to another nodelet on the same chip. In one embodiment, messaging buckets (e.g., 108, 110, 112) are not a part of the memory system of any of the nodelets on the chip. In one embodiment, hardware controllers in each nodelet (e.g., 104, 106) are used for accessing the messaging buckets (e.g., 108, 110, 112). Messaging buckets (e.g., 108, 110, 112) in one embodiment support the MPI network protocol. Messaging buckets contain memory and control logic for receiving messages from one nodelet, informing another nodelet about the message waiting, and ensuring exclusive access to a specific memory within the bucket as defined by the MPI protocol for message transfer between two nodes. Details on how this is implemented will be apparent from the description below.

Figure 2:
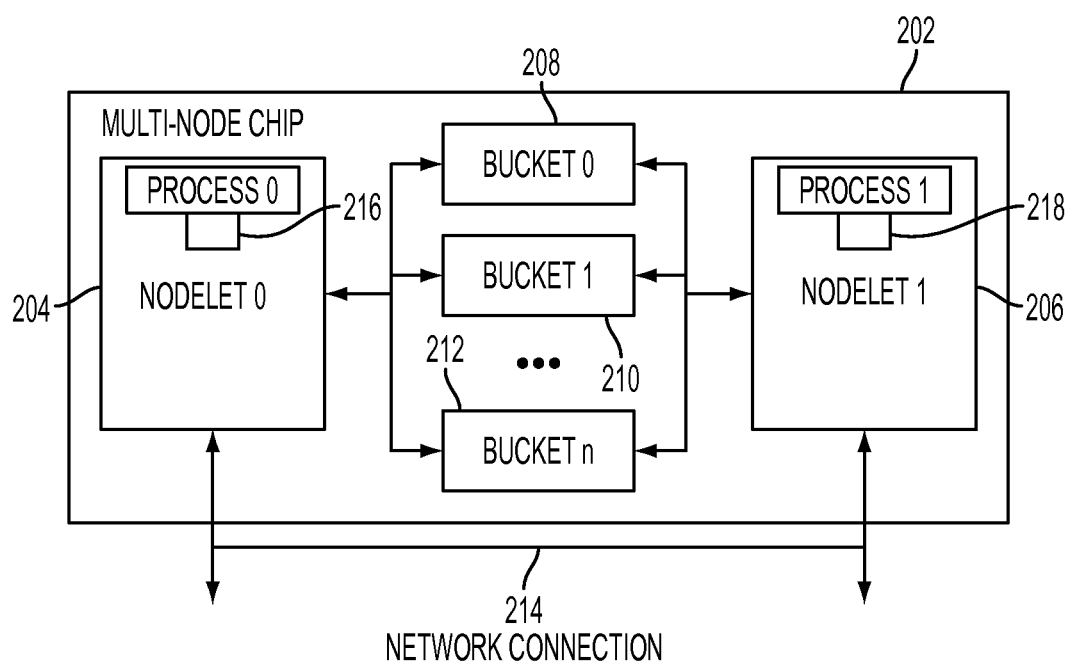
FIG. 2 illustrates a message communication mechanism between nodelets in one embodiment of the present disclosure.

FIG. 2 is a diagram that illustrates a message communication mechanism between nodelets in one embodiment of the present disclosure. Process 0 216 (e.g., a core) on nodelet 0 204 of a chip 202 may send a short MPI point-to-point message to Process 1 218 (e.g., a core) on nodelet 1 on the same chip 202, for example, as follows. Message sending between nodelets on the same chip is performed by using messaging buckets. Prior to sending a message from Process 0 216 to Process 1 218, an available bucket is identified for this transfer, and the identified bucket is reserved for the exclusive use for this message during the message transfer. This reservation is done transparently to an application by an operating system (OS). Process 0 216 initiates this functionality, for example, via a function or utility call such my_addr=bucket_alloc. This function, bucket_alloc, identifies an available bucket. This is an analogous call to malloc, and causes memory from bucket to appear normally in the calling process's address space 208. In one embodiment, the size of the bucket can be specified in the function as an argument. In another embodiment, the size of the buffer in the bucket can be predefined. Yet in another embodiment, different buckets have specified different sizes of buffers. Now, the new memory area appears as a part of the address space of the Process 0, and this process can write to this memory by addressing it. For example, Process 0 may perform appropriate calculations or computations, and write data to the allocated address. This maps Bucket 0 208 to Process 0 216, and Process 0 can perform an MPI_Send.

When Process 0 is ready to send a message from the Bucket 0 to Process 1, it calls MPI_Send function. The specialized control hardware in the Bucket 0 informs Process 1 that there is a message for it to receive, and that its location is Bucket 0. This triggers Process 1 to issue MPI_Recv call which will effectively map Bucket 0 to memory space of Process 1. After Process 0 216 and Process 1 218 call MPI_Send and MPI_Recv respectively, Bucket 0 208 is mapped to both processes 216, 218. With this, Bucket 0 belongs to the memory space of both processes, and both processes have full read and write access to it. However, to respect MPI syntax (or other network protocol syntax), a message, once sent, cannot be modified from the process which generated it any more, in one embodiment of the present disclosure. Similarly, in one embodiment of the present disclosure, if the message is still in the memory area of the Process 0, it cannot be modified by any other Process (including Process 1). Thus, when either of the process writes this Bucket 0 208, a "copy-on-write" protocol is triggered, where a new copy of the bucket is generated. The mapping is adjusted so that buckets now point to the correct owners.

Figure 3:
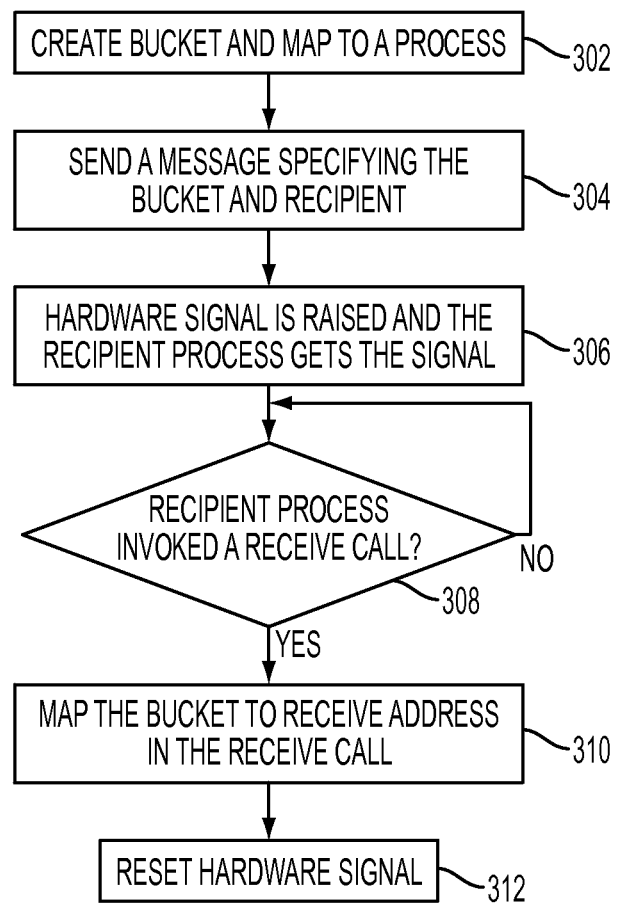
FIG. 3 is a flow diagram illustrating a nodelet-to-nodelet communication in one embodiment of the present disclosure.

FIG. 3 is a flow diagram illustrating a nodelet-to-nodelet communication in one embodiment of the present disclosure. A process or core (e.g., referred to as Process 0 or first process) on a nodelet (e.g., referred to as nodelet 0 or first nodelet) may send a message, e.g., a short MPI point-to-point message, to another process or core (e.g., referred to as Process 1 or second process) on another nodelet (e.g., referred to as nodelet 1 or second nodelet). At 302, a bucket is created and mapped to Process 0. A function call may be provided to create a bucket and map a process to it. For example, send_addr=Bucket_alloc (size, −1) (Process 0) may create a bucket and map to a process named Process 0. After the bucket is mapped, Process 0 can write message data to the bucket in the same way it is accessing any other memory. Once the message is ready to be sent, at 304, Process 0 sends a message by invoking a send function that is provided in the present disclosure. The send function specifies a number of parameters including information such as the address of the created bucket, the communicator information or group identifier of Process 0, format of the data, and the identifier of the recipient node which should receive the message. Invoking the send function raises a hardware signal to the recipient, the specific core on nodelet 1. The raised signal is received on nodelet 1, and it can either contain information to identify the receiving node and may contain the specific bucket (e.g., bucket_id) information with an active message waiting to be received, or it is a signal for the receiving nodelet that a message is waiting, after which a function is invoked to identify which node is receiving a message and in which bucket the message is waiting. An example of such send function is MPI_Send (send_addr, communicator_info, data_type, Process 1), where send_addr is a reference pointer to, or an address of the bucket, communicator_info is the group information that the recipient process is part of, data_type is the data format of the data being communicated, and Process 1 is the recipient of the message.

At 306, the recipient process, Process 1, gets the signal. At 308, depending on whether Process 1 had called a receive function before or after the signal, two scenarios may occur. An example of such receive function is MPI_Recv. In one embodiment of the present disclosure, only after Process 1 calls MPI_Recv function, a message can be received. If Process 1 did not call the MPI_Recv, the hardware signal remains in the pending state. At 310, after Process 1 calls MPI_Recv (recv_addr, communicator_info, data_type, Process 0), recv_addr is mapped to bucket_id, and the bucket memory is mapped to the receive addresses in the receiver memory space. The receiving process, Process 1, is enabled to read the data at the recv_addr. The message data already available in the bucket can be now accessed by Process 1. Thus, Process 1 receives the message, and the message is already in its memory. At 312, the hardware signal from the bucket is reset to reflect the status of the message being delivered.

Figure 4:
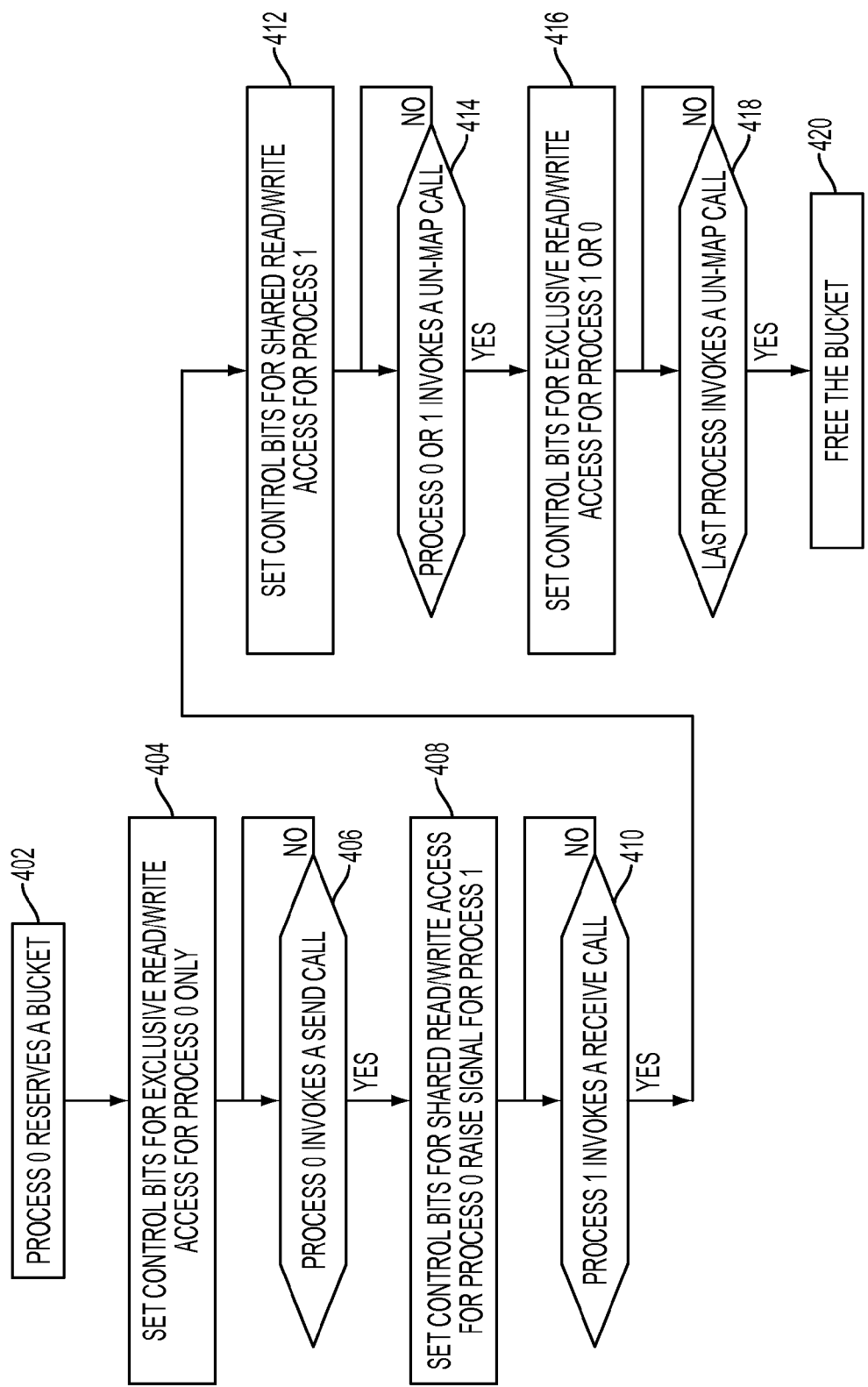
FIG. 4 illustrates how a bucket may be controlled for a write and read from a sender and receiver processes during a message transfer in one embodiment of the present disclosure.

FIG. 4 illustrates how a bucket may be controlled for a write and read from a sender and receiver processes during a message transfer in one embodiment of the present disclosure. At 402, a sender process may reserve a bucket. At 404, control bits are set for exclusive read/write access on this bucket for the sender process only. At 406, if the sender process invokes a send call or function, the control bits are set for shared read/write access for the sender process and a hardware signal is raised for a receiver process at 408. At 410, if the receiver process invokes a receive call or function, the control bits are set for shared read/write access for the receiver process. At 414, if the sender process or receiver process invokes an un-map call or like function, the bucket is disconnected from that process, and the control bits are set for exclusive read/write access for the other process which still has the bucket mapped. At 418, when both processes are disconnected from the bucket, the bucket is released.

Figure 5:
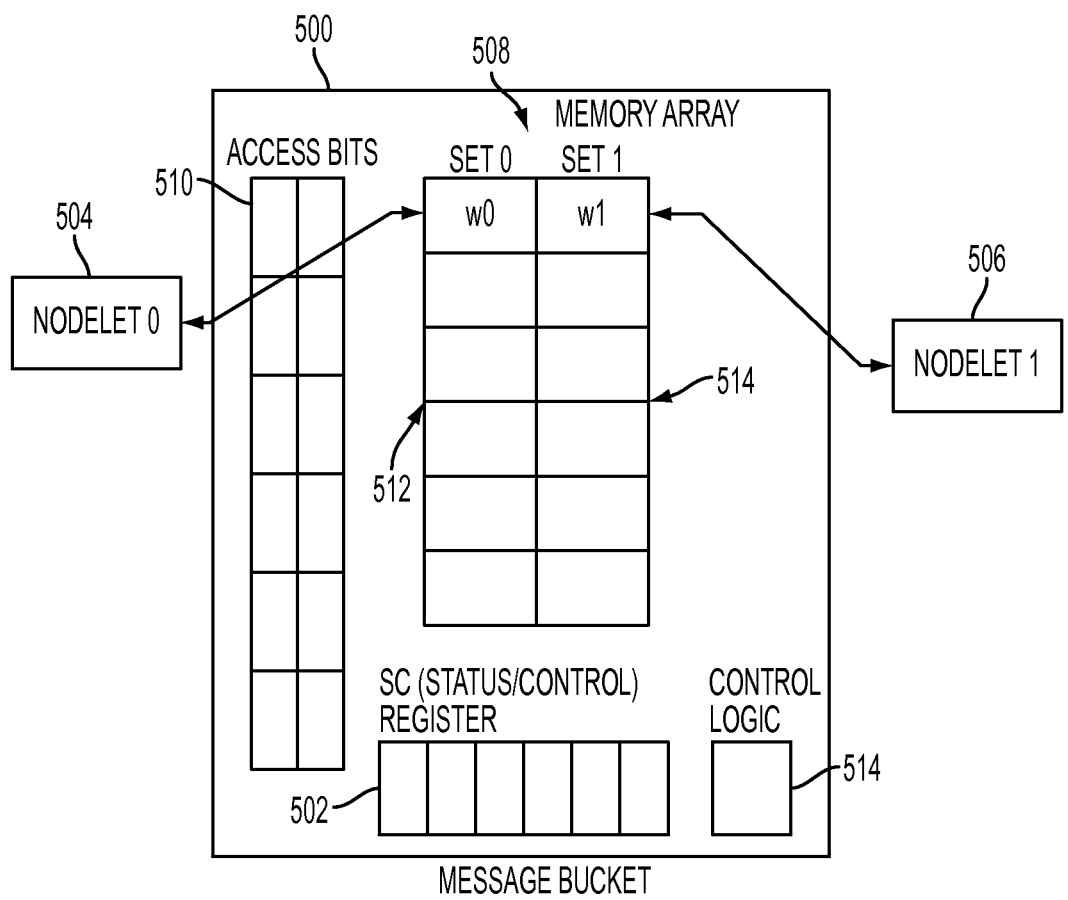
FIG. 5 illustrates an example of a message bucket in one embodiment of the present disclosure. The example shows two nodelet bucket implementation for point-to-point messaging.

FIG. 5 illustrates an example of a message bucket in one embodiment of the present disclosure. The example shows two nodelet bucket implementation for point-to-point messaging. A bucket 500 may include an array of memory 508 and hardware control logic 514 for accessing the memory array that complies with a network protocol. A bucket may also include a status/control (SC) register 502, and a set of access bits 510 for each element of the memory array 508. SC register 502 stores an indication of types of access a nodelet has for the elements of the memory array 508. The types of access that the SC register 502 may indicate may include, but not limited to, exclusive write, exclusive read, shared write, shared read, exclusive read and write, shared read and write, and others. In one embodiment, memory array 508 has two sets associated with each address, set 0 512 and set 1 514. Consider that a process on nodelet 0(N0) 504 allocated a buffer or memory array of bucket 500. Bucket 500 assigns exclusive read/write (RW) status to Nodelet 0 504. Nodelet 0 504 writes message data to the bucket 502 by using the set 0 512 of the bucket for the data. Nodelet 0 504 issues mpi_send specifying the address of the allocated bucket, e.g., addr1. Message bucket (MB) logic decodes addr1, and two scenarios may occur based on whether the addr1 is on the same chip, e.g., Nodelet 1 506, or whether addr1 is outside the chip. If addr1 is on the same chip, the logic of the message bucket 502 notifies Nodelet 1 506, for example, by issuing an interrupt. If addr1 is not on the same chip, the logic of the message bucket 500 notifies the network message unit (MU) connected to the chip that a message is ready to be sent via network interface on the chip (not shown). Nodelet 1 506 maps allocated receive buffer to bucket 500. Bucket 500 assigns read (R) status to Nodelet 1 506, and R status to Nodelet 0 504. The access status and sharing status per each process is indicated in the SC register 502. If both processes issue only read accesses, data is read out from the Set 0 512, and data in set 1 is not specified and not accessed.

In this example, two words (w0 and w1) in memory are mapped to every address word, set 0 and set 1. When a message is written, it is written in the first set, and all access bits 510 for all words written in the first word set are set to 11 for w0 and 00 for w1. If Nodelet 0 504 or Nodelet 1 506 issues a write to the allocated buffer after the access status was set to shared, the message bucket 500 detects a conflict. The message bucket 500 saves the modified word in the first set to w1 location of the memory bucket, and sets the access bits for the modified word only in w0 to 01, and for w1 to 10—thus, Nodelet 1 sees its buffer unmodified, and Nodelet 0 sees its modification. If Nodelet 0 504 issues a write to the allocated buffer into a word with w0 11 and w1 00, it writes the modified word in the w1, and the message bucket sets bits for w0 to 10 and for w1 to 01. These two sets of access bits define for each memory element and for the two sets which process has access to each set. The two access bits define the visibility of the set in this memory entry for each of the two processes. Thus, for example value 01 for w0 and 10 for w1 indicate that Nodelet 0 504 has access to the set 1, but not to the set 0, whereas Nodelet 1 has access to the set 0 but not to the set 1. In this way, there are two different copies of the conflicting data which one of the processes modified after a mpi_send call was issued. Nodelet 0 504 and Nodelet 1 506 have their private copies of data which they can modify without changing the data for the other process. For memory entries which were not written by any of the processes after mpi_send was issued, data are placed in the set 0, and access bits for this memory entry are 11 for w0 and 00 for w1.

Figure 6:
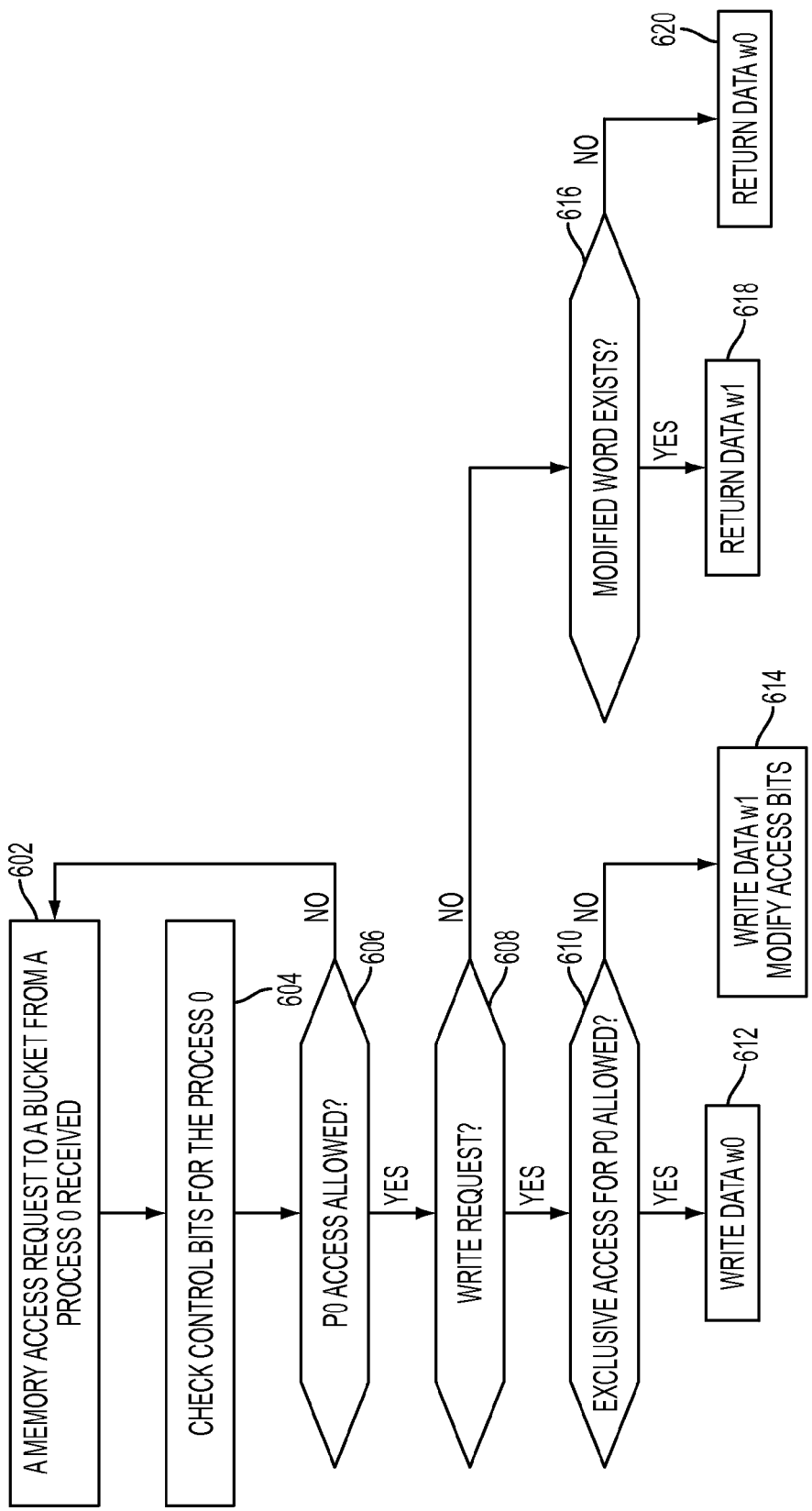
FIG. 6 illustrates buffer copying in one embodiment of the present disclosure.

FIG. 6 is a flow diagram illustrating invoking of a buffer copy in one embodiment of the present disclosure. At 602, a memory access request to a bucket from a process, e.g., referred to as process 0 is received. At 604, control bit setting in the bucket for process 0 is checked. In one embodiment of the present disclosure, once a bucket is mapped, only sending process 0 and receiving process 1 have access to it. At 606, it is checked whether process 0 has access to this bucket. If so, at 608, it is checked whether the request is a request to write to the bucket. If so, at 610, it is checked whether process 0 has exclusive access. If so, data is written to a first word set, set 0, in bucket memory at 612. Otherwise, if process 0 does not have exclusive access but shared, data is written to a second word set, set 1 in bucket memory at 614. At 608, if it is determined that the request is not a write request, at 616, it is checked whether a modified word exists. If so, at 618, data in the second word set, set 1 is returned. If not, at 620, data in the first word set, set 0 is returned. While this flow chart describes access for the first process 0, the access to the bucket from a receiver process, e.g., referred to as process 1 can be performed by always accessing the first word set, set 0. For example, the first nodelet which starts writing to a shared word will start using set 1 words w1, and the other nodelet (a receiver nodelet) will continue using set 0 words w0. The access bits are modified accordingly and can be different from row to row in the memory array.

Figure 7:
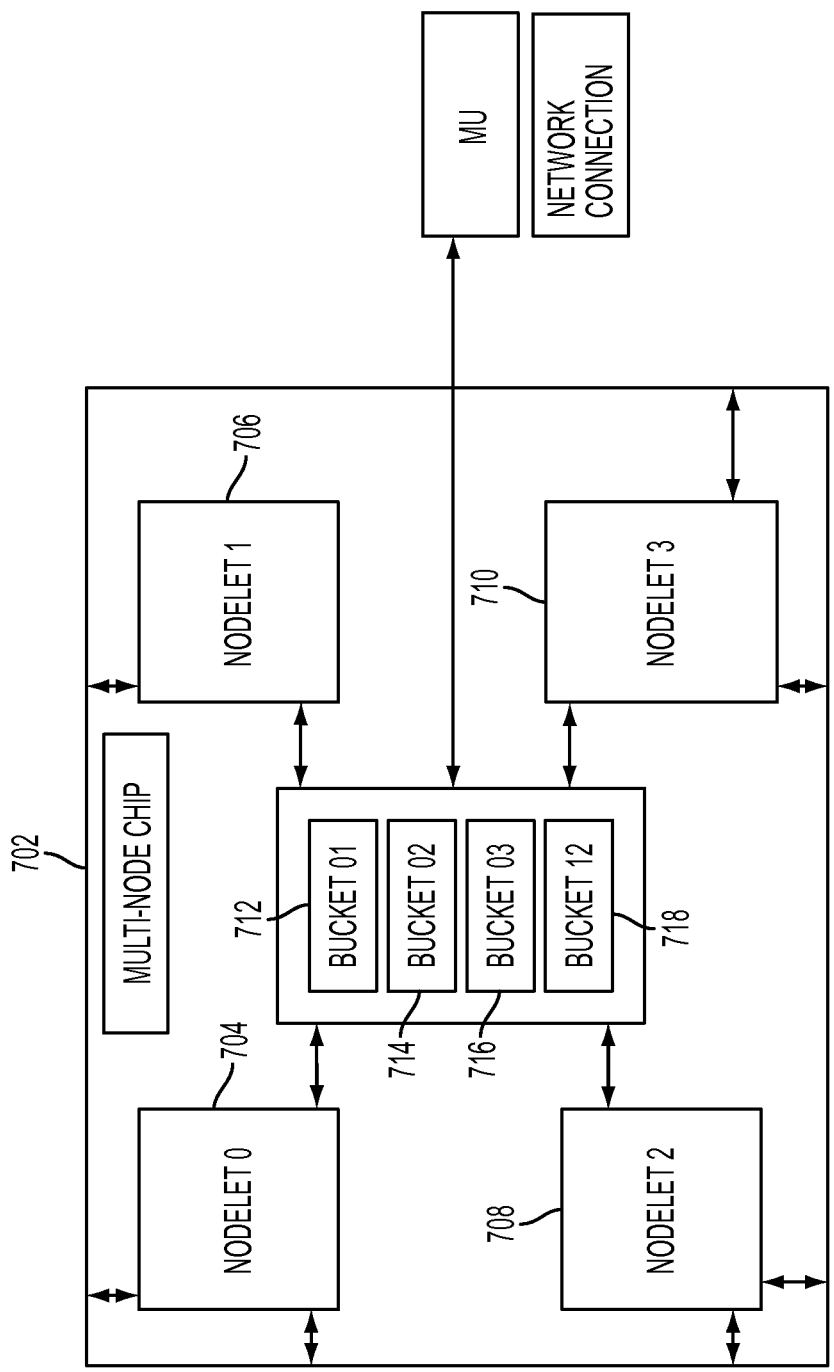
FIG. 7 illustrates multiple nodelets on a die in one embodiment of the present disclosure.

FIG. 7 illustrates multiple nodelets on a die in one embodiment of the present disclosure. A die shown in FIG. 7 may be a piece of semiconductor material or dielectric upon which one or more electrical components may be integrated, e.g., mounted, etched, or formed. In one embodiment, buckets (e.g., 712, 714, 716, 718) are shared across all the nodelets (e.g., 704, 706, 708, 710) on the multi-node chip 702, and can be accessed by all nodelets on the chip. In one embodiment, only two nodelets—one sending and one receiving nodelet—are connected to a bucket. In another embodiment, each bucket (e.g., 712, 714, 716, 718) may be mapped to more than one nodelet (e.g., 704, 706, 708, 710) where one nodelet is sending a message, and other nodelets are receiving the message. For example, Process 0 on Nodelet 0 (704) can send the same message to all the other nodelets, Nodelets 1 (706), Nodelet 2 (708) and Nodelet 3 (710), in which case all of those nodelets point to the same bucket, and are mapping the memory area of that bucket to their memory spaces, and can access data from the same bucket.

Figure 8:
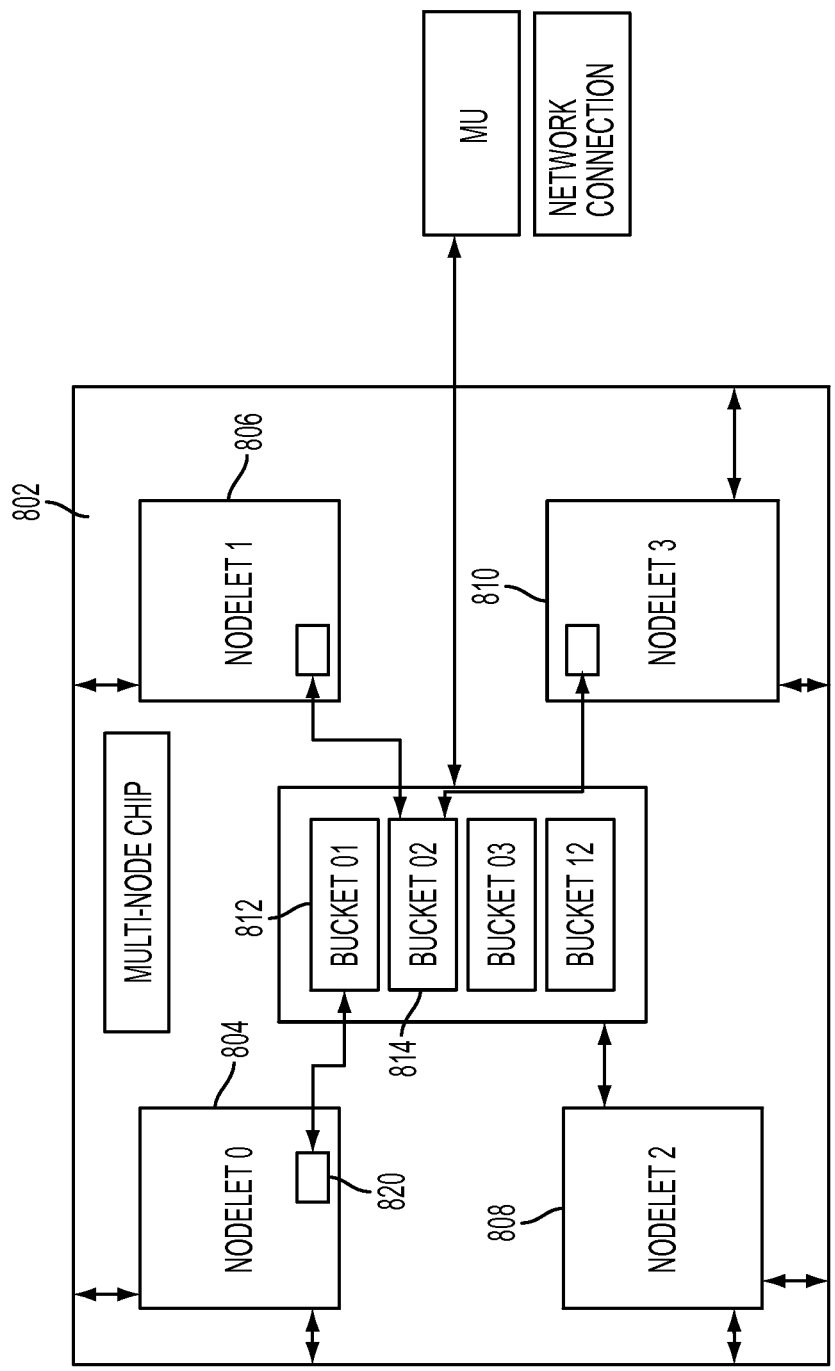
FIG. 8 illustrates scenario when a buffer is modified by a process in one embodiment of the present disclosure.

FIG. 8 illustrates an example scenario when a bucket buffer is used for sending a modified message by a process in one embodiment of the present disclosure. Initially, a process 820 on Nodelet 0 (804) sends a message to Nodelet 1 (806) and Nodelet 3 (810). Initially, Nodelet 0 (804) is a sender of the message in Bucket 01 812) and Nodelets 1 (806) and 3 (810) will point to Bucket 01 (812) as the recipients of that message. The scenario illustrated in this figure occurs if a process 820 in Nodelet 0 (804) modifies its buffer (812) to send it to another process, for example to Nodelet 2 (808). In this case, before the modified data is written to Bucket 01, a new bucket (e.g., 814) with a copy of Bucket 01 data is generated to keep the message to Nodelet 1 (806) and Nodelet 3 (810). The new bucket (e.g., 814) holds the message that was in Bucket 01 (812) before the message in that bucket is modified. In one embodiment, hardware control logic makes a copy of Bucket 01 (812) into the new bucket (e.g., 814) and changes pointers, so that Nodelet1 (806) and Nodelet 3 (810) point to the new bucket (e.g., 814). In another embodiment, new data (modified data) may be written to Bucket 02 instead, and Bucket 01 left intact with original data, in which case the pointers of Nodelet 1 806 and Nodelet 3 810 would be left to point to Bucket 01 812; and Nodelet 2 808 would point to Bucket 02 814 instead to receive the modified message.

Figure 9:
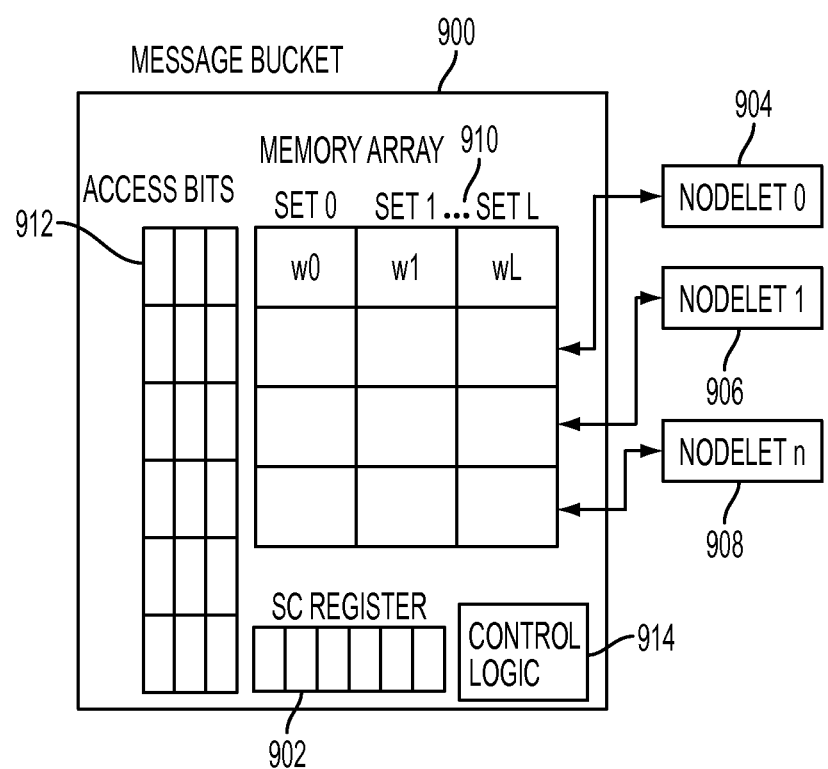
FIG. 9 illustrates an example of a message bucket, in which multiple nodelets bucket implementation is provided for communicating a message to multiple nodelets.

FIG. 9 illustrates an example of a message bucket, in which multiple nodelet bucket implementation is provided for communicating a message to multiple nodelets. A bucket 900 comprises memory array 910, access bits 912, status register 902, and control logic 914. The memory array 910 can be accessed from multiple nodelets 904, 906, 908 and contains a number of sets for each entry of the memory array in the buckets. Each row of the memory array within a bucket has L sets of words in parallel, with L words (w0, w1, . . . wl-1) mapped to each address. Thus, to any address in the memory space within the bucket, L words are mapped. In one embodiment, the number of words L is 2 or more, but is less or equal to the number of nodelets who can access it. Each memory array element has M access bits 912 assigned to it, where M is the number of nodelets who can access and map this bucket into their address simultaneously. The m-th bit for any word w-sub-k specifies the ownership of that word to the m-th nodelet. Initially, the ownership of the first set 0 containing words w0 is assigned to the sending and receiving nodelet. If the sending or receiving nodelet attempt to write to that set 0 and the bucket is in the shared mode, a conflict is detected and the new word is written into another word, e.g., word w1. The access bits for the words, w0 and w1, are modified to describe the new ownership. In this example, the access bits for word w1 are set to those of the access bits for word w0 before the attempt to write to that buffer. The access bits for w0 would be set to include the recipients of the rewritten buffer (w0). If the sending nodelet sends this buffer (w0) to the third or fourth nodelet, more ownership bits are set for each word owned by the sender. There can be up to L different versions of the buffer, with ownership specified by access bits, and participating nodelets and the bucket mode being specified in the SC register.

The buckets of the present disclosure can also be generalized to other programming models.

For example a universal program counter (UPC) creates a shared memory array by using calls such as upc_all_alloc, upc_global_alloc. These can be accessed by all the threads. In another aspect, MPI remote memory access (RMA) has a notion of memory windows, with each process exposing a specific memory size to all the processes, e.g., MPI_WIN_CREATE. When these processes or threads are within a node, the buckets can be used to expose this window or arrays to one-another. The buckets provide the necessary "coherency domain" for accesses to this arrays or Memory windows. These models have different memory consistency semantics, for example, UPC dictates either writes to be relaxed or strict. RMA also has the concept of local "vs"

remote memory window, which need to be explicitly synched so that the memory is consistent. The bucket logic of the present disclosure in one embodiment can be extended to incorporate these programming model related semantics and consistency models.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including a hardware description language (HDL), an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog as applicable. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for intra-die inter-nodelet messaging communication, comprising:
    allocating a bucket comprising a memory array and hardware control logic that supports message passing interface semantics, for communicating data between a first process on a first memory domain and a second process on a second memory domain, wherein the first memory domain and the second memory domain are not shared, and wherein the bucket is not part of memory coherence domains of the first process and the second process;
    mapping the bucket to the first process as part of address space of the first process;
    writing, by the first process, message data to the bucket and invoking a send message passing interface function that raises a hardware signal to the second process; and
    mapping the bucket to a memory space of the second process in response to the second process invoking a receive message passing interface function, the hardware signal that is raised triggering the second process to invoke the receive message passing interface function, wherein the second process is enabled to read the data in the mapped bucket,
    wherein after the first process invokes the send message passing interface function, the message data in the bucket cannot be modified from the first process.

2. The method of claim 1, wherein the first process is a component of a first nodelet having the first memory domain on a single chip and the second process is a component of a second nodelet having the second memory domain on the single chip.

3. The method of claim 1, wherein the bucket is shared across all nodelets on the single chip.

4. The method of claim 1, wherein the bucket is mapped to a plurality of receiving nodelets.

5. The method of claim 1, further including resetting the hardware signal in response to the second process invoking the receive message passing interface function.

6. A system for intra-die inter-nodelet messaging communication, comprising:
    a plurality of nodelets on a single chip, each of the nodelets having its own memory coherence domain that is not shared with the rest of the nodelets on the single chip, each nodelet comprising one or more process cores, wherein the plurality of nodelets comprise at least a first nodelet having a first process core and a first memory coherence domain, and a second nodelet having a second process core and a second memory coherence domain;
    a bucket comprising a memory array and hardware control logic that supports message passing interface semantics, for communicating data across the plurality of nodelets, wherein the bucket is not part of the memory coherence domains of the nodelets, wherein
    the first process core is enabled to map the bucket to the first process core as part of address space of the first process, write message data to the bucket and invoke a send message passing interface function that raises a hardware signal to the second process core, the hardware signal that is raised triggering the second process to invoke a receive message passing interface function and wherein in response to the second process core invoking the receive message passing interface function, the bucket is mapped to a memory space of the second process core for enabling the second process core to read the data,
    wherein after the first process invokes the send message passing interface function, the message data in the bucket cannot be modified from the first process.

7. The system of claim 6, wherein the bucket is shared across all nodelets on the single chip.

8. The system of claim 6, wherein the bucket is mapped to a plurality of receiving nodelets.

9. The system of claim 6, wherein the memory array includes a number of words in memory mapped to every address word, each of the number of words corresponding to one of said nodelets that can access said bucket, and the bucket further including an access bit register operable to store bits indicating which nodelet has access to which of said number of words.

10. The system of claim 9, wherein the number of words is two or more, but less or equal to a number of said plurality of nodelets.

11. The system of claim 10, wherein the bucket further includes a status register operable to store status of access rights of said plurality of nodelets to said memory array.

12. The system of claim 11, wherein in response to an attempt by the first process core to write data to a first word of the number of words, the hardware control logic of the bucket is operable to determine whether the first process core has exclusive read and write access to the first word, and if the first process core has the exclusive read and write access to the first word, the data is written to the first word, and if the first process core does not have the exclusive read and write access to the first word, the data is written to a second word of the number of words, and the access bit register is modified to indicate that the first process core now has access to the second word.

13. A computer readable storage medium, excluding a signal per se, storing a code of instructions executable by a machine to perform a method of intra-die inter-nodelet messaging communication, the method comprising:
    allocating a bucket comprising a memory array and hardware control logic that supports message passing interface semantics, for communicating data between a first process on a first memory domain and a second process on a second memory domain, wherein the first memory domain and the second memory domain are not shared, and wherein the bucket is not part of memory coherence domains of the first process and the second process;
    mapping the bucket to the first process as part of address space of the first process;
    writing, by the first process, message data to the bucket and invoking a send message passing interface function that raises a hardware signal to the second process; and mapping the bucket to a memory space of the second process in response to the second process invoking a receive message passing interface function, the hardware signal that is raised triggering the second process to invoke the receive message passing interface function, wherein the second process is enabled to read the data in the mapped bucket,
    wherein after the first process invokes the send message passing interface function, the message data in the bucket cannot be modified from the first process.

14. The computer readable storage medium of claim 13, wherein the first process is a component of a first nodelet having the first memory domain on a single chip and the second process is a component of a second nodelet having the second memory domain on the single chip.

15. The computer readable storage medium of claim 13, wherein the bucket is shared across all nodelets on the single chip.

16. The computer readable storage medium of claim 13, wherein the bucket is mapped to a plurality of receiving nodelets.

17. The computer readable storage medium of claim 13, further including resetting the hardware signal in response to the second process invoking the receive message passing interface function.

18. A method for intra-die inter-nodelet messaging communication, comprising:
    reserving a bucket comprising a memory array and hardware control logic that supports message passing interface semantics, for communicating data between a first process on a first memory domain and a second process on a second memory domain, wherein the first memory domain and the second memory domain are not shared, and wherein the bucket is not part of memory coherence domains of the first process and the second process;
    setting a plurality of control bits to indicate exclusive read and write access for the first process only;
    receiving a send call invoked by the first process;
    setting the control bits to indicate shared read and write access for the first process and raising a hardware signal for the second process in response to receiving the send call;
    receiving a receive call invoked by the second process;
    setting the control bits to indicate shared read and write access for the second process in response to receiving the receive call;
    in response to receiving an un-map call from the first process, setting the control bits to indicate exclusive read and write access for the second process; and
    in response to receiving an un-map call from the second process, setting the control bits to indicate exclusive read and write access for the first process.

19. The method of claim 18, further including:
    in response to determining that all processes have unmapped from the bucket, releasing the bucket.

20. The method of claim 18, further including:
    receiving a memory access request to the bucket from the first process, checking the control bits associated with the first process;
    in response to determining that the control bits indicate that the first process has access rights, determining whether the memory access request is a write request;
    in response to determining that the memory access request is a write request, determining whether the first process has exclusive read and write access;
    in response to determining that the first process has exclusive read and write access, writing to a first word set of the memory array;
    in response to determining that the first process does not have exclusive read and write access, writing to a second word set of the memory array and indicating modification of the first word set;
    in response to determining that the memory access request is not a write request, determining whether a modified word exists, and in response to determining that the modified word exists, returning data in the second word set, and in response to determining that the modified word does not exist, returning data in the first word set.

* * * * *